United States Patent Office 2,901,880
Patented Sept. 1, 1959

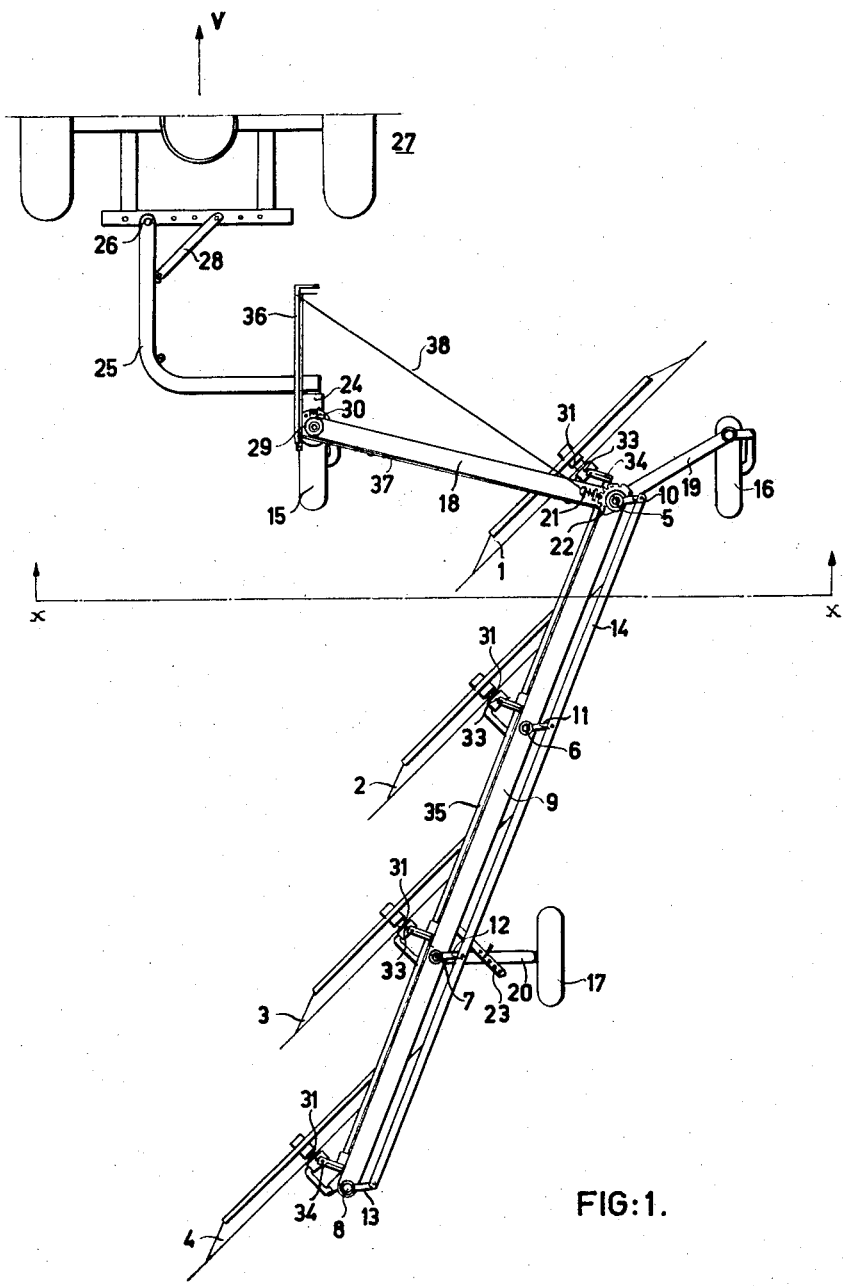
FIG:1.

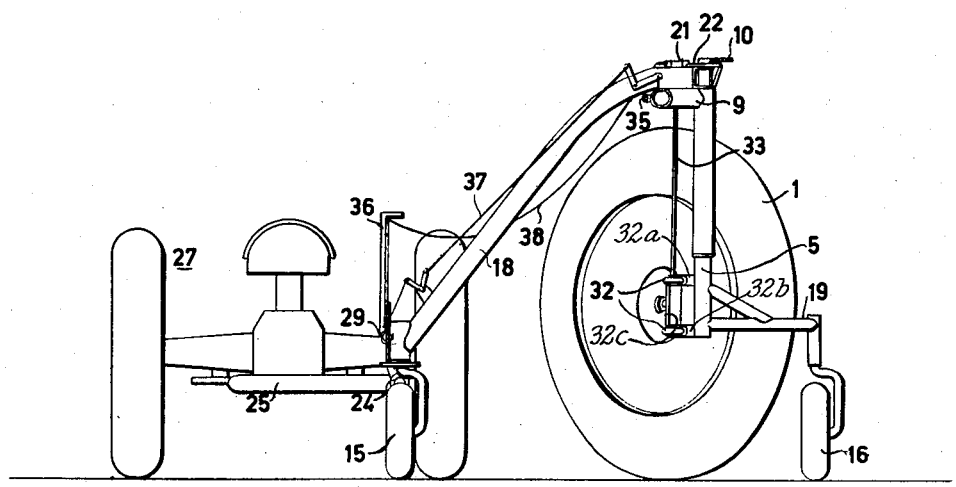
FIG: 2.

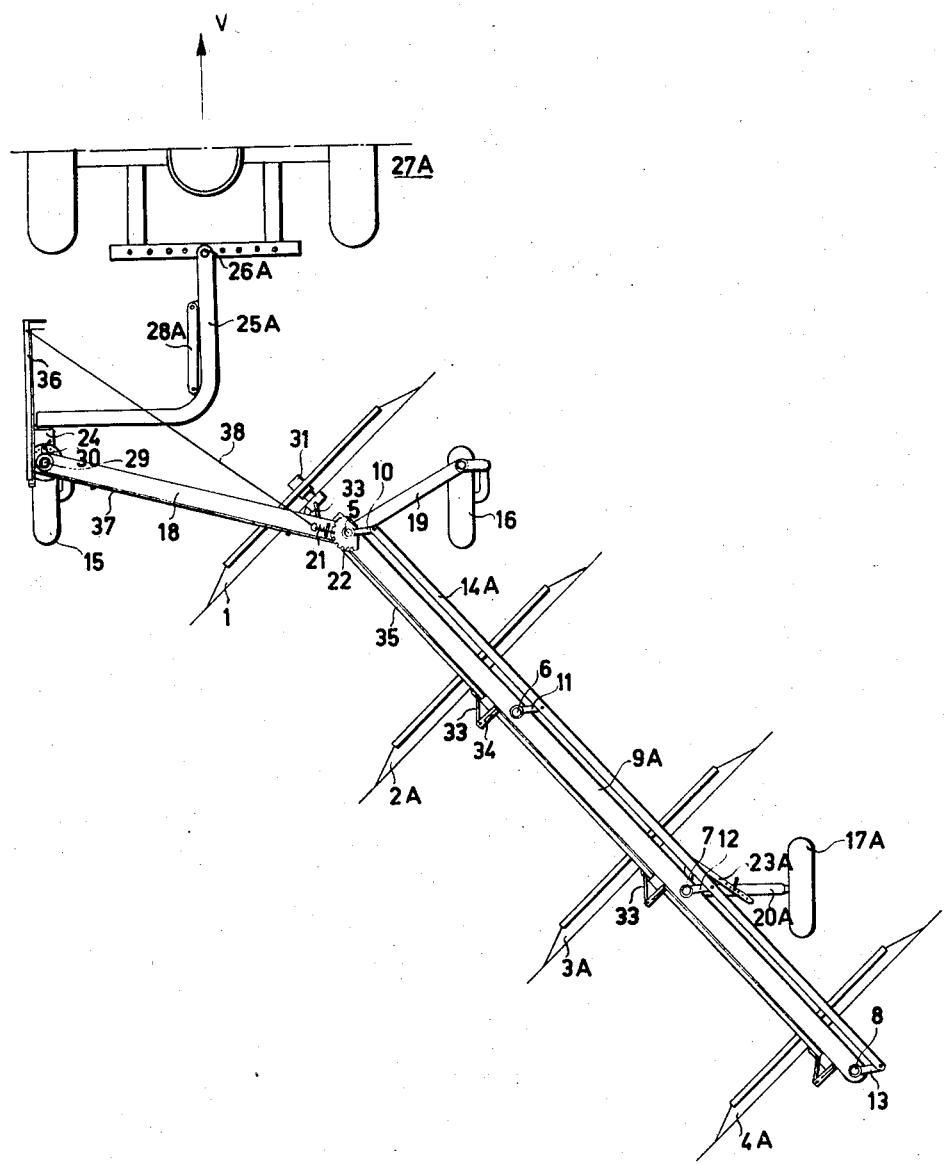
FIG: 3.

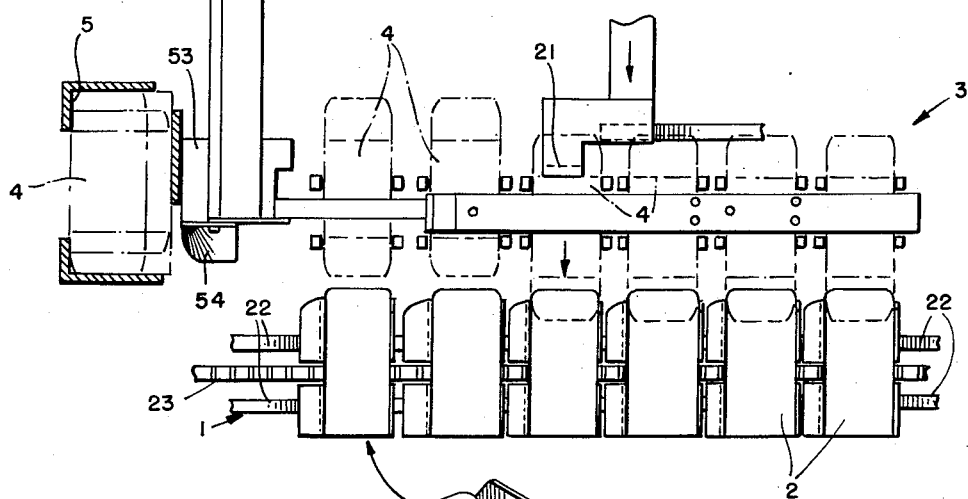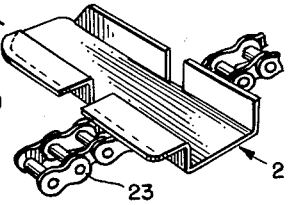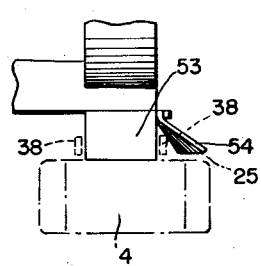

2,901,880

DEVICE FOR LATERALLY DISPLACING CROP LYING ON THE GROUND

Cornelis van der Lely and Ary van der Lely, Maasland, Netherlands, assignors to C. van der Lely, N.V., Maasland, Netherlands, a Dutch limited-liability company Application June 26, 1956, Serial No. 593,961

Claims priority, application Netherlands June 29, 1955

16 Claims. (Cl. 56—377)

The invention relates to devices for laterally displacing material, such as hay, lying on the ground, and more particularly to devices of the type provided with a frame to which a number of rake wheels are attached and supported by a plurality of running wheels.

Known devices have the drawback that their frames are of exceedingly large dimensions due to which the devices are expensive and unmanageable.

It is an object of the invention to provide an improved device of the afore-noted kind which avoids the above deficiencies.

According to the invention at least one running wheel is coupled to a rake wheel, whereas at the same time a running wheel is controlled to turn about a vertical axis by a turning of the rake wheel about its vertical axis.

It is an advantage of the invention that it provides for a simple frame construction. A further advantage is that the running wheels can be turned to various positions about a vertical axis to maintain a most favorable position for overcoming resistance to movement caused by the rake wheels.

Further advantages of the invention are more fully described in connection with some embodiments of the invention with reference to the annexed drawings in which:

Fig. 1 is a plan view of a device according to the invention,

Fig. 2 is a partially sectional view taken along line X—X of Fig. 1,

Fig. 3 is a plan view of the device in a second working position,

Fig. 4 shows the device in transport position.

In Fig. 1, four rake wheels 1, 2, 3 and 4 are mounted on a frame 9 so as to be rotatable about the vertical axles 5, 6, 7 and 8. Said vertical axles 5, 6, 7 and 8 are provided with projections 10, 11, 12 and 13 and the hingedly connected to a coupling bar 14. The frame is supported by running wheels 15, 16 and 17 which are fixed to the vertical axles 5 and 7 by means of supporting members or arms 18, 19 and 20.

By means of a spring loaded locking device or pin 21 which is mounted on the supporting member 18 and which locking pin engages a toothed sector 22 fixed on the frame 9, the running wheels and the rake wheels can be secured with regard to the frame 9 (see also Fig. 2).

The running wheels 15 and 16 are self-adjusting. The running wheel 17 is not self-adjusting, but the supporting member 20 is attached so as to rotate with the rake wheel 3 on axle 7 and is secured in position by means of a coupling bar 23. Thus, the rake wheel 3 and the running wheel 17 are jointly rotatable about the vertical axle 7.

In close proximity to the running wheel 15, a horizontal pivot is mounted to which a draw arm 25 is rotatably fixed. Said draw arm 25 is coupled to a tractor by a pivot 26 which can be fixed in position by a bar 28.

A vertical axle 29 is positioned above the horizontal pivot 24 and the draw arm 25 is rotatable about said axle 29. The draw arm is adjustably secured to said axle by means of locking device or pin 30.

The rake wheels 1, 2, 3 and 4 are supported on axles 31 which are supported by parallelograms of links or systems 32. Bars 33 are attached at one end to said parallelograms and at the other ends are connected to supports or projections 34 on axle 35. The axle 35 can be turned and the rake wheels are raised by means of a lever 36 and a connecting system of bars 37. It will be noted that the parallelograms each comprise two parallel links 32a and 32b as seen in Fig. 2, these links being pivotally connected to at least a third interconnecting link 32c.

In the embodiment illustrated in Fig. 1, the device works as a side-delivery rake. The tractor 27 is located at a most favorable position with regard to the side-delivery rake, because the rake projects from the tractor at one side and because of the fact that it is possible to rake easily along the sides of the field. The tractor further has a favorable position for overcoming the resistance to movement caused by the rake wheels which are obliquely arranged with regard to the direction of travel. The lever 36 is conveniently within reach of the driver.

If it is desired to convert the side-delivery rake into a swath turner by using the engine power of the tractor, the bar 28 can be positioned as is shown in Fig. 1. The locking pin 21 is then pulled back by means of cable or cord 38. If the tractor 27 is caused to make a turn to the right, the frame 9 will be turned counterclockwise about the vertical axle 5. Rake wheels 2, 3 and 4 and the running wheel 17 turn with respect to the frame 9 and, with the device in a position corresponding to that illustrated in Fig. 3, the locking pin 21 is released, due to which it again secures the pivot or axle 5. The draw arm 25 and the bar 28 are then released from the tractor 27 and the draw arm 25 is turned 180° about the pivot 24 and coupled at the rear of the tractor.

The device of Fig. 3 works as a teddering device. The rake wheels 1, 2A, 3A and 4A, each rake a small strip and displace the material for airing. The running wheels 15, 16 and 17A have a most favorable position for operation. The draw arm 25A imparts to the tractor 27A a favorable position relative to the machine for being able to make tight turns as well as for overcoming resistance to movement caused by the rake wheels which are arranged obliquely with respect to the direction of travel. The lever 36 remains within the reach of the driver of the tractor 27A.

In Fig. 4 the device is shown in transport position. For obtaining this position, the locking pin 21 is pulled out of the toothed sector 22. The coupling bar 28B is connected to the rearmost end of the tractor 27 and said rearmost end of the tractor is turned to the right until the position illustrated in Fig. 4 is reached. The locking pin 21 is then employed to lock axle 5 and the bar 28B of the tractor is released. The device can be transported in a favorable manner. Preferably, the rake wheels 1, 2B, 3B and 4B are raised by means of the lever 36. Further the draw arm 25B can be adjusted about the vertical pivot 29. After the coupling bar 23B is released, the running wheel 17B together with the supporting member 20B is turned with regard to the rake wheel 3B and is then fixed by securing the coupling bar 23B. The running wheel 17B then steers the device in favorable transport position.

There will now be obvious to those skilled in the art many modifications of the structure set forth. These modifications, however, will come within the spirit of the invention as defined by the following claims.

What we claim is:

1. A raking implement operable with a ground traversing source of traction power and capable of controlling the disposition of a raking element by means of the direction of travel of said source comprising: a mobile frame connectible to said source, a substantially vertical axle coupled to said frame, a raking wheel constituting the raking element connected to said axle, and a running wheel for supporting said frame, said running wheel being coupled to said axle so that the position of the running wheel relative to the frame is co-ordinated with the position of the raking wheel relative to said frame.

2. An implement as claimed in claim 1 comprising a locking device operatively associated with said axle for releasably fixing said running wheel and rake wheel relative to said frame.

3. An implement as claimed in claim 1 comprising a locking device operatively associated with said axle for locking the running wheel and thereby the raking wheel for rotation in fixed position relative to said frame.

4. An implement as claimed in claim 1 comprising a plurality of additional raking wheels, a plurality of additional vertical axles coupling said additional raking wheels to said frame, and means operatively associated with the frame for coupling said additional raking wheels to the first said raking wheel whereby all of said raking wheels are disposed in accordance with the position of said running wheel.

5. An implement as claimed in claim 1 comprising additional running wheels, additional vertical axles coupled to said frame, and support arms for said additional running wheels and rigidly connected to said additional vertical axles for rotation therewith.

6. An implement as claimed in claim 1 comprising additional running wheels, an additional vertical axle coupled to said frame, support arms operatively associated with said additional running wheels and rigidly connected to said additional vertical axle for rotation therewith; and a draw arm operatively associated with the frame and being hingeably connected between one of said support arms and said source of traction power.

7. An implement as claimed in claim 1 comprising a parallelogram linkage system operatively associated with the frame and coupling said raking wheel to said vertical axle and means operatively associated with the frame and coupled to said rake wheel for controlling its angular relationship to said vertical axle.

8. An implement as claimed in claim 1 comprising a toothed sector mounted on said frame, a further vertical axle, an arm supported on said axle, a further running wheel supported on said arm for supporting said frame, a spring-loaded pin mounted on said arm for engaging said toothed section and means operatively associated with the frame for engaging and disengaging the pin with and from said sector for the adjustment of said arm.

9. An implement as claimed in claim 1 comprising a horizontal axle rigidly connected to said vertical axle for supporting said running wheel.

10. An implement as claimed in claim 1 comprising a frame member, a pivotal connection between said frame and frame member, a locking device normally locking said frame and frame member in fixed relative positions, a vertical axle connected to said frame member, a draw arm, a horizontal pivot connecting said draw arm to the latter said vertical axle, and means operatively associated with the frame to release said locking device for adjusting the position of said frame.

11. An implement with an adjustable raking wheel comprising a frame, a vertical axle on said frame, a parallelogram linkage system coupled to said vertical axle, a support, a raking wheel connected by said support to said linkage system for rotation thereupon, and means operatively associated with said system to control the configuration of the parallelogram linkage system to thereby control the angular position of said raking wheel relative to said vertical axle.

12. An implement as claimed in claim 11 wherein said linkage system comprises at least three links, two of which are parallel, and pivot connections connecting the third of links between the parallel links.

13. A raking implement comprising a mobile vertical axle, a rotatable raking wheel defining an axis angularly disposed relative to said axle, means connecting said wheel to said axle for revolution about said axle, and a running wheel rigidly connected to said axle for controlling the position of said raking wheel.

14. A raking implement comprising a ground traversing frame, pivot means on said frame, a running wheel connected to said pivot means and thereby movable relative to said frame, and a raking wheel connected to said pivot means for movement relative to said frame in accordance with the movement of said running wheel relative to said frame.

15. A raking implement comprising a steerable tractor, a mobile frame pivotally connected to the tractor, a vertical axle on said frame, a raking wheel connected to the axle and revolvable thereon, a running wheel connected to the axles for supporting the frame, said running wheel rotating said axle in accordance with the engagement between said wheel and the ground.

16. A raking implement comprising a frame, vertical axles on the frame, rake wheels on the axles and aligned in a row, a running wheel on one of said axles and pivotal thereabout through an angle of at least about ninety degrees, said one axle and the rake wheel on the same being pivotal with said running wheel, and locking means operatively associated with the frame and said running wheel to fix the latter relative to said frame in at least two positions whereby the implement functions selectively as a side delivery rake and a tedder.

References Cited in the file of this patent

UNITED STATES PATENTS

| | | |
|---|---|---|
| 2,597,828 | Spurlin | May 20, 1952 |
| 2,602,280 | Crowe et al. | July 8, 1952 |